D. D. HUYETT AND A. L. REGISTER.
SYSTEM OF CONTROL FOR INTERMITTENT ABSORPTION REFRIGERATING PLANTS.
APPLICATION FILED JUNE 3, 1918. RENEWED SEPT. 28, 1920.
1,376,884.
Patented May 3, 1921.
4 SHEETS—SHEET 1.
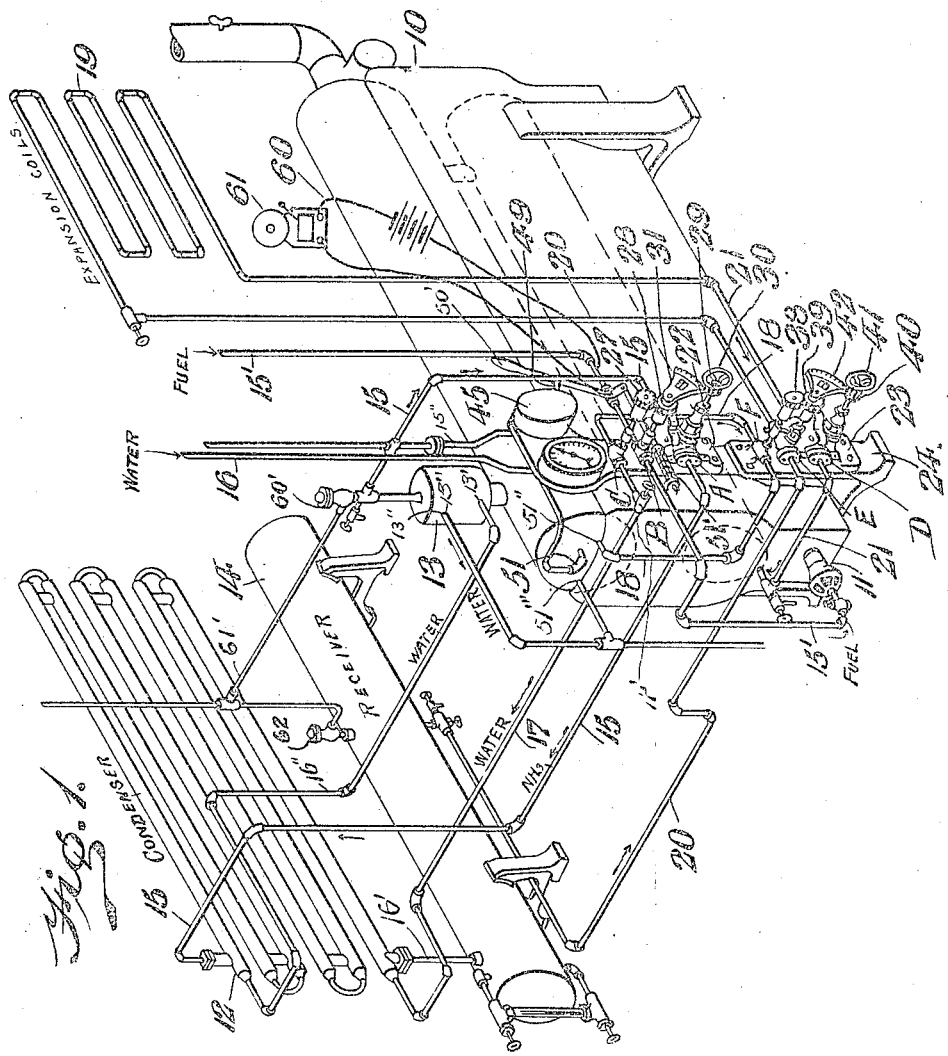
Inventors
Daniel D. Huyett and
Albert L. Register
By
Attorney

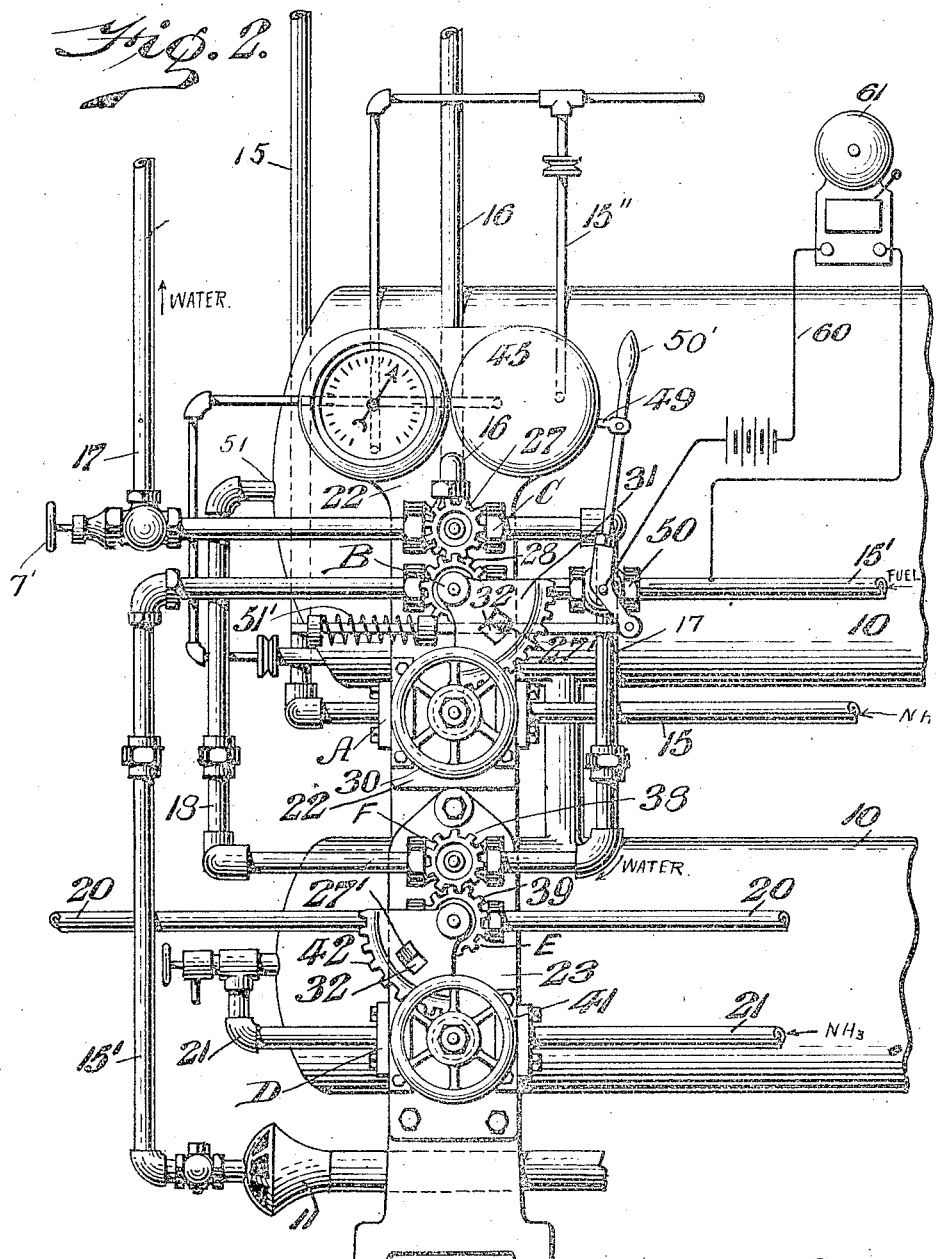

D. D. HUYETT AND A. L. REGISTER.
SYSTEM OF CONTROL FOR INTERMITTENT ABSORPTION REFRIGERATING PLANTS.
APPLICATION FILED JUNE 3, 1918. RENEWED SEPT. 28, 1920.
1,376,884.
Patented May 3, 1921.
4 SHEETS—SHEET 3.
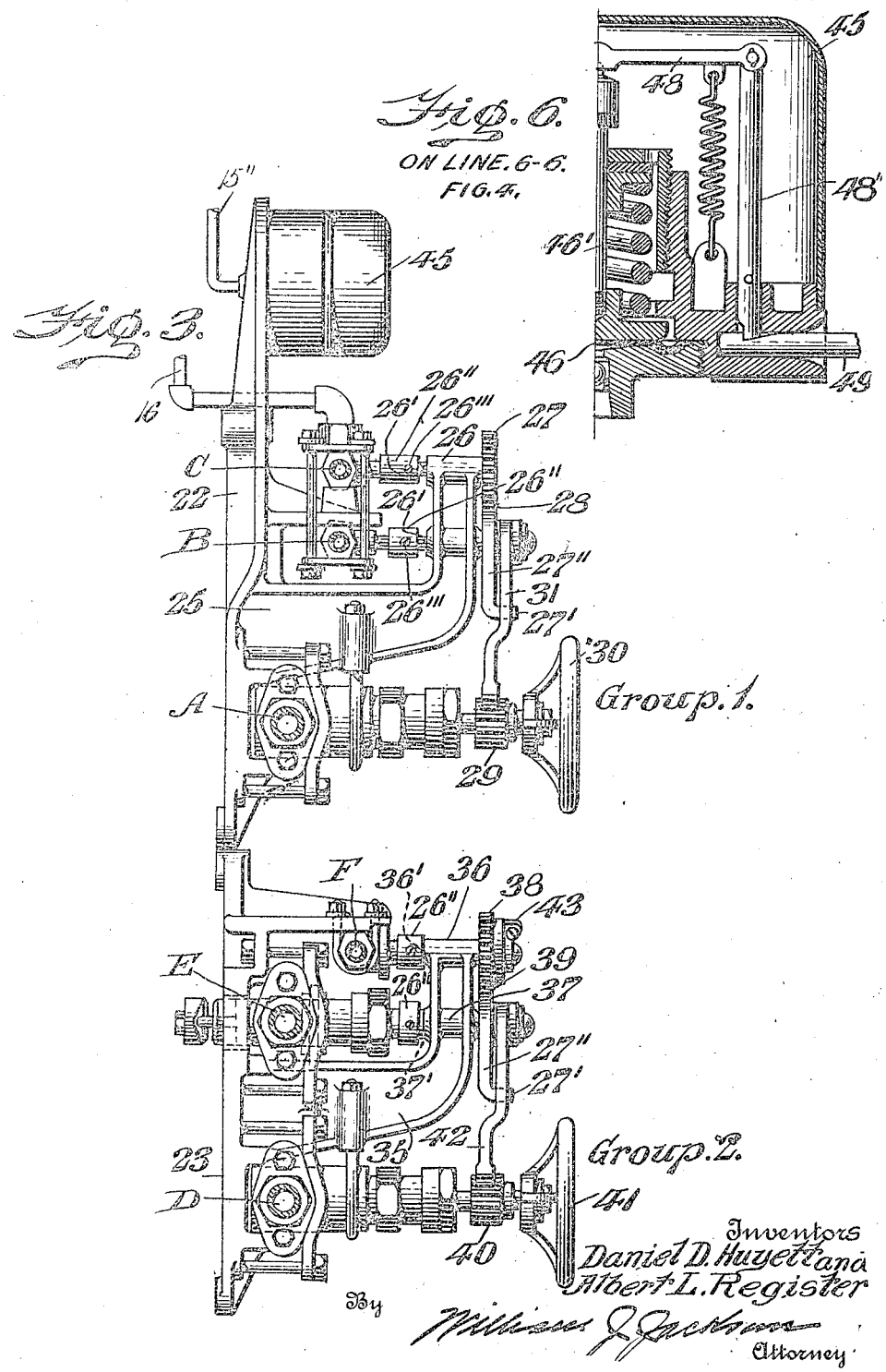

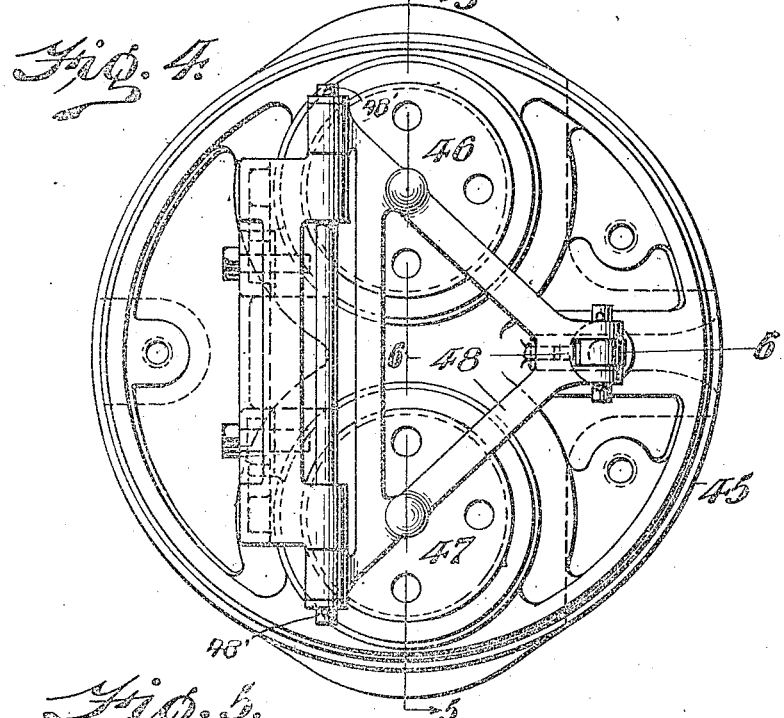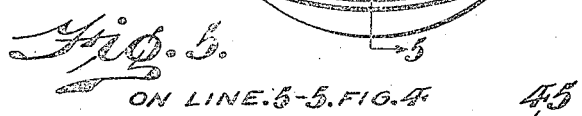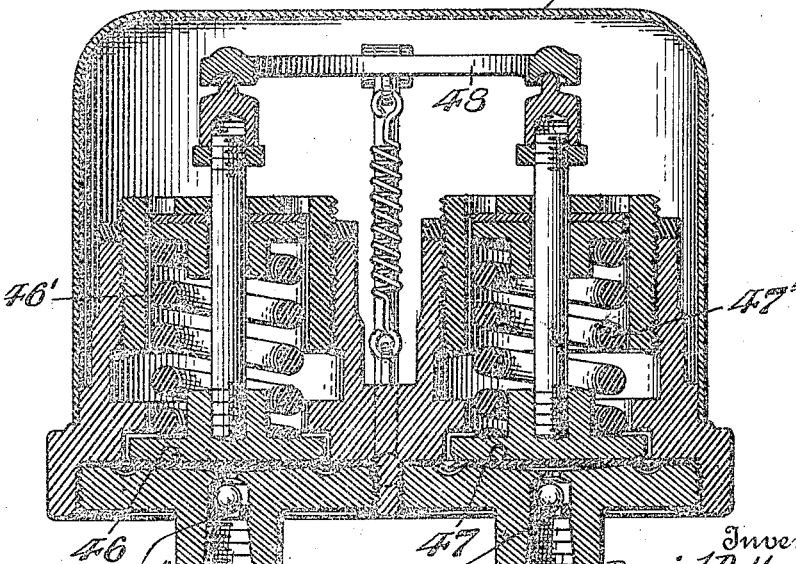

UNITED STATES PATENT OFFICE.

DANIEL D. HUYETT AND ALBERT L. REGISTER, OF PHILADELPHIA, PENNSYLVANIA, ASSIGNORS TO VACUUM REFRIGERATION COMPANY, OF PHILADELPHIA, PENNSYLVANIA, A CORPORATION OF DELAWARE.

SYSTEM OF CONTROL FOR INTERMITTENT-ABSORPTION REFRIGERATING PLANTS.

1,376,884.    Specification of Letters Patent.    Patented May 3, 1921.

Application filed June 3, 1918, Serial No. 238,017. Renewed September 28, 1920. Serial No. 413,440.

*To all whom it may concern:*

Be it known that we, DANIEL D. HUYETT, and ALBERT L. REGISTER, citizens of the United States, residing at Philadelphia, county of Philadelphia, and State of Pennsylvania, have jointly invented a certain new and useful System of Control for Intermittent-Absorption Refrigerating Plants, of which the following is a specification.

This invention relates to refrigerating machines of the intermittent absorption type and has more particular relation to a system of control therefor.

In refrigerating machines of this type, attempts have been made to automatically control the changes in the cycle of operations but it has been found in practice, commercially considered, that the instrumentalities required to bring about necessary results are so unreliable as to frequently render such systems inoperative, thereby offsetting the advantages otherwise possessed. An object of the present invention is to provide a practical and commercially valuable system of manual control for intermittent absorption refrigerating machines for positively changing in an expeditious, reliable and simple manner the cycle of operations. Another object of the present invention is to accomplish such manual control of cycle changes from a central point by two groups of control valves. Other and further objects of the present invention reside in the provision of certain new and novel arrangements, constructions and combinations of parts as will hereinafter more specifically be pointed out.

The invention consists of the improvements hereinafter described and finally claimed.

The nature, characteristic features and scope of the invention will be more fully understood from the following description taken in connection with the accompanying drawings forming part hereof and in which:

Figure 1 is a perspective view of refrigerating apparatus with the system of control of the invention applied thereto.

Fig. 2 is a fragmentary view in front elevation thereof.

Fig. 3 is a view in side elevation of the control valves shown in Fig. 2.

Fig. 4 is a face view of the safety device shown in Figs. 1 and 2.

Fig. 5 is a view taken upon the line 5—5 of Fig. 4, and

Fig. 6 is a detail view of the latch connection complemental to the safety device.

For the purpose of illustrating our invention, we have shown in the accompanying drawings, a form thereof which is at present preferred by us, since the same has been found in practice to give satisfactory and reliable results, although it is to be understood that the various instrumentalities of which our invention consists can be variously arranged and organized and that our invention is not limited to the precise arrangements and organization of the instrumentalities as herein shown and described.

In the drawings and referring more particularly to Fig. 1, 10 designates a generator-absorber for containing aqua ammonia or equivalent refrigerant liquor. The generator-absorber is of the type composed of a pair of super-imposed tanks or drums interconnected by circulating pipes through which a thermal circulation of aqua is set up between said tanks when the lower one is heated and the upper one is cooled. 11 designates a heater which may be a gas burner or other suitable heating medium. 13 designates a simple form of dehydrator composed of a small pressure tight compartment in communication with the upper tank of the generator-absorber and in which there is a small water-circulating coil having an inlet at 13′ and an outlet at 13″. The hot high pressure ammonia vapor passes through the dehydrator en route to a condenser and is cooled therein by the cooling water sufficiently to precipitate moisture entrained therein. The moisture as it condenses drips back from the dehydrator to the generator-absorber. 12 designates a condenser, for instance, of the double pipe or atmospheric type. The refrigerant receiver is designated 14. These parts are of standard type. The pipe connections between these parts, however, are arranged in a special manner in order that interconnected standard valves may be employed at a central point for the manual control of the changes of cycle of operations incident to the manufacture of a refrigerant in apparatus of the character stated. Leading from the dehydrator 13 to the condenser 12 is a discharge pipe line 15, there being a valve A interposed in said pipe line. Leading from condenser 12 to receiver 14 is a pipe 16' through which liquid ammonia gravitates to the receiver 14. Leading from a suitable source, not shown, is a pipe connection 15' to the heater 11, which connection is provided with a valve B. Leading from a suitable source, not shown, to a three-way valve C is a pipe 16 for supplying a cooling liquid, as water, to the condenser 12 by way of pipe 17 and to the generator-absorber by way of pipe 18. A valve 17' is interposed in said pipe 17 which may be manually adjusted to regulate the flow of cooling liquid. The pipe 18 does not lead directly to the generator-absorber, however, but is provided with a secondary water valve F. Cooling liquid flows through pipe 16'' from the top of the condenser to the dehydrator and thence passes to waste. From valve F the water line leads to a water circulating coil in the upper tank having an inlet at 51'' and an outlet at 51''' which serves to cool the weak aqua after the proper amount of ammonia has been distilled and also serves to carry away the heat of absorption from the aqua during a refrigerating period. Leading from the refrigerant-receiver 14 to the expansion coils 19 is a pipe 20 provided with a valve E. Leading from the expansion coils 19 through the valve D is a refrigerant-suction connection 21 which connection is returned to the generator-absorber 10. The valves A, B, C are mounted upon a bracket 22, see Figs. 2 and 3 and the valves D, E, F are mounted upon a similar bracket 23 which brackets, in turn, are bolted to a suitable support, as for instance, one of the stands 24 upon which the generator-absorber is mounted. The valves A, B, C are interconnected as are the valves D, E, F and the manner of interconnecting each group of valves will now be given.

Carried by the bracket 22 is an arm 25 provided with bearings 26 rotatable in which are the extensions 26' of the stems of the valves B and C. The extensions 26' each have fitted thereto a socket 26'' which fits over the squared end of the usual stem of a standard type of cock and said extensions are fixed thereto by means of screws or the like 26'''. By this arrangement special valves are not required. Gear-wheels 27 and 28 are fixed to the respective ends of the extensions 26' of valves B and C, which gear-wheels mesh with one another. The stem of valve A which is a standard three-way cock is provided with a pinion 29 and a hand-wheel 30. Loosely mounted upon the stem of valve B is a toothed segment 31 which segment is in mesh with pinion 29. This segment is vertically slotted as at 32 to loosely receive the lateral extensions 27' of an arm 27'' fixed to and depending from gear-wheel 27. The gear-wheels 27 and 28 require a movement of but 90° while the pinion of valve A is required to be turned a number of times. Thus in opening or closing valve A, when the last tooth of segment 31 is reached the segment ratchets upon the pinion 29. This is possible because of the loose fit between the slot 32 and extension 27' and the loose fit of the segment upon extension 26'. This arrangement of valves constitutes what will hereinafter be termed group 1. A description will now be given of group 2. Carried by bracket 23 is an arm 35 provided with bearings 36 and 37 rotatable in which are the extensions 36' and 37', stems of valves E and F. Gear-wheels 38 and 39 are provided on the respective ends of these extensions and intermesh and a pinion 40 and hand-wheel 41 are mounted on the stem of valve D. Loosely mounted upon the stem of valve E is a toothed segment 42 which segment is slotted and has connection with gear-wheel 39 in a manner similar to that described with respect to group 1. The stem of valve F is provided with a device 43, by the manual adjustment of which valve F may be set to the desired opening when valves D and E are open. When valves D and E are closed, valve F is wide open. The function of device 43 is to cut down the flow of cooling water through the coil in the upper generator tank when valves of group 2 are open for refrigeration and provide a full flow of cooling water through said coil during a cooling period.

From the above description, it is apparent that the changes of cycle of operations of the apparatus may be controlled from a central point through the medium of the manually operated groups 1 and 2.

A description will now be given of the mode of operation of the apparatus above described. The generator-absorber is charged with a refrigerant liquor, for instance, aqua ammonia and heat is applied to drive off ammonia vapor from the water. The vapor is dried in the dehydrator and passes under pressure to the condenser. Upon condensation taking place the liquid gravitates to the ammonia liquid receiver. This may be termed the heating or generating period.

To provide against undue or excess heating during the above period there is provided an automatic control device comprising a simple unit. This device functions at the termination of each heating period, cutting off the fuel when the proper final aqua temperature and corresponding percentage of concentration has been reached and may also operate a signal to notify the operator that it is necessary to close valves of group 1. If, by any chance, he fails to do this at once, no abnormal condition will result.

Attention within a reasonable time after the heat is shut off will give refrigeration by the usual operation of valves of group 1 and subsequent operation of valves of group 2. A description of this device will be given at this time.

Supported by the portable bracket 22 is a casing 45 containing two metallic diaphragms 46 and 47 directly opposed by adjustable, coiled springs 46′ and 47′. These diaphragms are adapted to operate a pivotal rock arm 48. The rock arm 48 is attached to a fixed pivot 48′ and whenever either of the diaphragms 46—47 are forced upward by pressure, the pin 48″ is raised releasing a latch 49 which holds the fuel valve 50 open against the opposing action of a spring 51′ or equivalent device. Ammonia pressure in the generator-absorber operates through pipe 15″ against diaphragm 46 and by the proper adjustment of its complemental spring it can be made to shut off the fuel and stop the heating period in case the ammonia pressure reaches a maximum safe limit through any obnormal cause. Expansion fluid, for instance, water, in a sealed tube 51 or equivalent device within the generator-absorber when heated creates a pressure which works against diaphragm 47 to similarly close the fuel valve 50 when a predetermined temperature has been reached in the generator-absorber. The ball check valves 46″ and 47″ prevent loss of ammonia or expansive fluid by closing in case of breakage of the diaphragms. Diaphragm 47 actuates and closes valve 50 at the expiration of each heating period. This action automatically stops the heating and distillation of ammonia at the time the charge of aqua ammonia has been reduced to the desired proper percentage of concentration. By closing of valve 50 which automatically occurs when lever 50′ is released by latch 49, an electric circuit is closed thereby giving an audible or visual signal to the operator. In the drawings this signal is shown as being a bell 61 in the electric circuit 60. If for any reason the control device 45 does not properly function, in event of excess of ammonia pressure in generator absorber, a safety relief valve 60′ having outlet through pipe 61′ to the atmosphere is provided to relieve said pressure. A safety relief valve 62 is also provided for the ammonia liquid receiver 14 which valve has outlet to the atmosphere through said pipe 61′ the purpose of which is to relieve pressure of ammonia in the receiver due to overheating when shut off from the generator absorber.

The hand wheel 30 of group 1 is now operated to close valves A, B, C, thus shutting off the discharge to the condenser, shutting off the supply of fuel to the heater and shutting off the supply of water to the condenser through pipe 17 to permit flow of cooling liquid to the generator-absorber. This cooling liquid passes by way of valve F and pipe 18 to the upper tank of the generator-absorber, which tank has a cooling coil therein for cooling the weak aqua remaining in said tank and serves to reduce tank pressure and create a vacuum therein. The above operation is known as the cooling operation.

Any time subsequent to cooling the generator-absorber and the creation of a vacuum therein, the plant is ready to do refrigerating work. To start the refrigerating or absorbing period, hand-wheel 41 of group 2 is operated to open valves F, E and D. Liquid ammonia now passes under receiver pressure to the expansion valve and refrigerating coils 19, the suction connection 21 having been opened to allow the expanded ammonia vapor to return to the generator-absorber where it is absorbed by the weak aqua. Certain heat of association liberated by the absorption of ammonia gas in the weak aqua must be carried away from the generator-absorber during the refrigerating or absorbing period in order to maintain the proper back or suction pressure in the generator-absorber. If the absorbing period is extended for a reasonably long time, this heat will be radiated to a large extent through the shell of the generator-absorber and little or no cooling water through coil in upper generator tank will be required. The amount of this flow, depending upon initial temperature of cooling water and length of absorbing period can be regulated by means of device 43 and valve F described above.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What we claim is:

1. In a system of control for intermittent-absorption refrigerating plants, a generator-absorber, a dehydrator, a condenser and receiver, means for heating the generator-absorber, water cooling means for the generator-absorber, said parts being operatively connected by pipe lines and a plurality of independent, centralized, groups of manually operable valves controlling the flow through said pipe lines, each group consisting of a series of valves interconnected to move in unison and so arranged that for a heating or generating period the setting of a single valve of one group closes the ammonia liquid supply from said receiver, closes the ammonia gas return to said generator-absorber and opens the generator-absorber cooling water supply and which valves are so arranged that the setting of a single valve of the remaining group opens the ammonia discharge from said dehydrator, opens the condensing water supply and closes the generator-absorber cooling water supply and opens the means of fuel supply to said heating means.

2. A system of control as described in claim 1, the valves of which are so arranged that for a refrigerating operation the setting of a single valve of one group opens the ammonia liquid supply, opens the ammonia gas return and throttles the generator-absorber cooling water supply.

3. A system of control as described in claim 1, the valves of which are so arranged that for a cooling operation the setting of a single valve of one group closes the discharge to the condenser, closes the fuel supply to the heating means, closes the water supply to the condenser and opens the generator-absorber cooling liquid supply.

4. A system of control as described in claim 1, each group of valves comprising a series of three valves interconnected to move in unison and manual means for simultaneously operating all valves of one group independently of the valves of the other group.

5. A system of control as described in claim 1, characterized by a fuel valve located in the pipe line connecting with the heating means, said valve being located in advance of said groups of valves, manual means for opening said fuel valve after said groups of valves have been properly manipulated, and a control device operable by ammonia pressure and ammonia temperature connected with respect to said fuel valve for automatically closing said fuel valve upon predetermined ammonia pressure and ammonia temperature.

6. A system of control as described in claims 1 and 5 characterized by a signal operable upon the automatic closing of said fuel valve whereby notice is given the operator in charge that the group of valves controlling the fuel supply must be closed.

7. A system of control as described in claim 1, characterized by brackets carried by said generator-absorber which brackets have mounted thereon said groups of valves.

8. A system of control as described in claim 1, characterized by two groups of independent, centralized, cycle changing valves, each group consisting of a series of three valves interconnected to move in unison, one valve of each group being constructed for manual operation and the remaining valves of each group being so positioned that they move substantially 90° during several complete turns of the manually operated valves.

9. A system of control as described in claim 1, characterized by groups of independent, centralized, cycle changing valves, each group consisting of a series of valves interconnected to move in unison, one valve of each group being arranged for manual operation and the remaining valves of each group being so positioned that they move a predetermined distance during the movement of the manually operated valves.

In testimony whereof, we have hereunto signed our names.

DANIEL D. HUYETT.
ALBERT REGISTER.